United States Patent [19]

Mucheyer

[11] Patent Number: 4,571,500

[45] Date of Patent: Feb. 18, 1986

[54] ELECTRIC CIRCUIT FOR CONTROLLING A TRACTOR-PULLED MOUNTED DEVICE ADJUSTABLE IN HEIGHT BY A HYDRAULIC JACK

[75] Inventor: Norbert Mucheyer, Rechtenbach, Fed. Rep. of Germany

[73] Assignee: Mannesmann Rexroth GmbH, Fed. Rep. of Germany

[21] Appl. No.: 603,445

[22] Filed: Apr. 24, 1984

[30] Foreign Application Priority Data

May 4, 1983 [DE] Fed. Rep. of Germany ....... 3316305

[51] Int. Cl.⁴ .......................................... A01B 63/112
[52] U.S. Cl. ..................................... 307/154; 172/10; 172/7
[58] Field of Search ..................... 307/154, 119; 172/2, 172/4, 7, 9, 10–12

[56] References Cited

U.S. PATENT DOCUMENTS

| 3,732,933 | 5/1973 | Foxwell et al. | 172/9 X |
| 3,757,131 | 9/1973 | Krutz et al. | 307/66 X |
| 4,132,273 | 1/1979 | Mortonson et al. | 172/7 X |
| 4,300,638 | 11/1981 | Katayama et al. | 172/10 |

FOREIGN PATENT DOCUMENTS 2927585  7/1979  Fed. Rep. of Germany .

Primary Examiner—A. D. Pellinen
Assistant Examiner—Todd E. DeBoer
Attorney, Agent, or Firm—Harness, Dickey & Pierce

[57] ABSTRACT

The position control and force control of a device mounted to a tractor, in particular for controlling the depth penetration of a plough, is supplemented by a lowering speed-responsive control to limit the lowering speed to a predetermined maximum value in order to increase safety of operation. Activating and disabling the lowering speed signal takes place in response to operating a mode select switch provided for the position control and force control as well as in response to a high-speed actuation of the mounted device. Furthermore, the lifting and lowering function of the hydraulic jack of the mounted device may be locked to prevent undesired motions of the mounted device when the system is put in operation.

6 Claims, 1 Drawing Figure

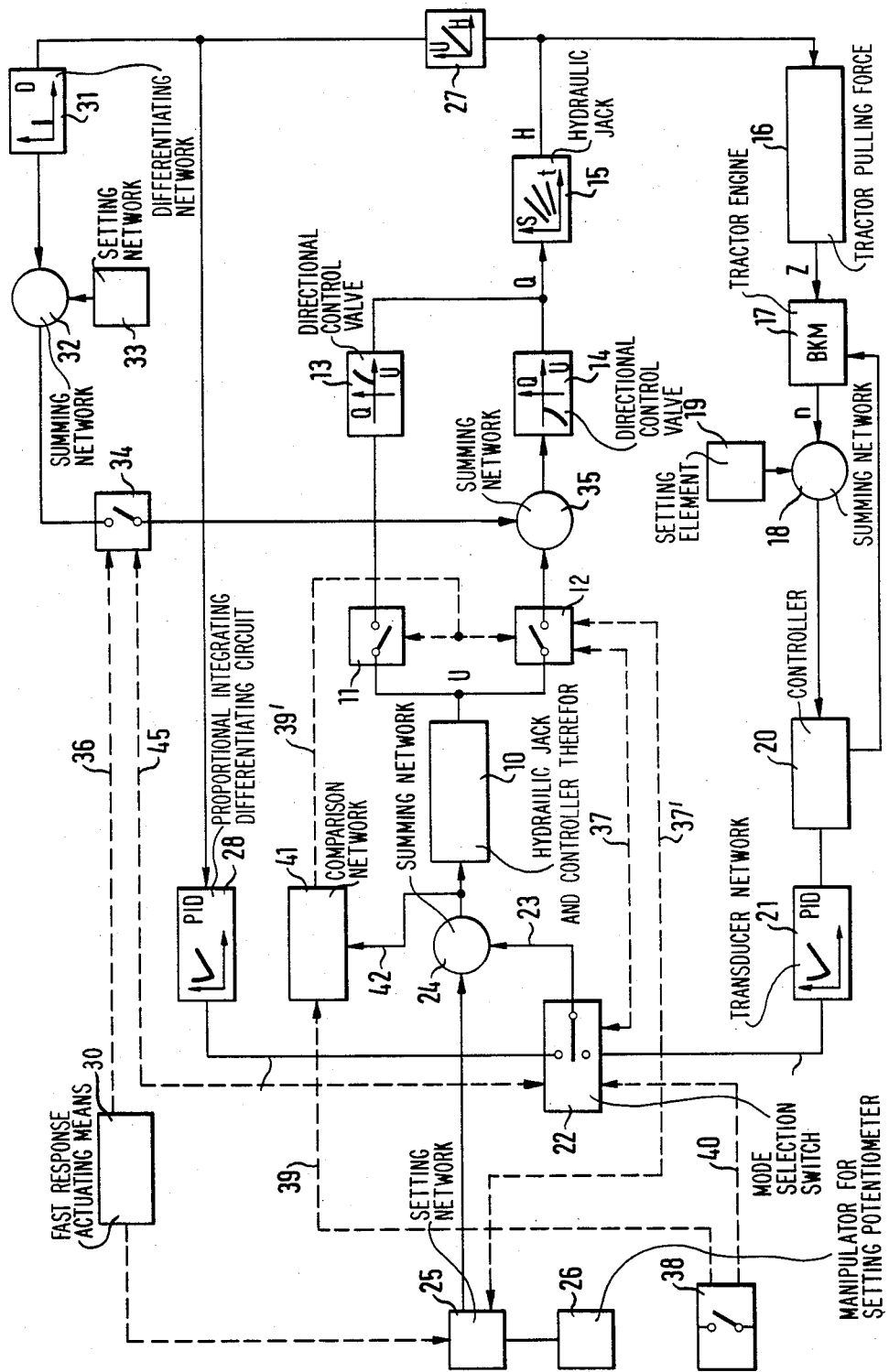

ELECTRIC CIRCUIT FOR CONTROLLING A TRACTOR-PULLED MOUNTED DEVICE ADJUSTABLE IN HEIGHT BY A HYDRAULIC JACK

FIELD OF THE INVENTION

The present invention relates to an electric circuitry for controlling a device mounted to a tractor, said device being adjustable in height by a hydraulic jack, comprising a controller for activating the lifting and lowering motion of the jack, to which controller a differential signal is applied which is combined of a reference input defining a desired value and a position-responsive or force-responsive actual value.

PRIOR ART

Prior systems for the jack control of agricultural tractors operate in response to signals indicating the position or, respectively, elevation of the mounted implements and signals indicating the pulling force of the tractor. An input reference signal defining a desired value and a measured actual signal are combined and the control signal resulting therefrom is applied to a jack controller. The jack controller electrically activates directional control valves to lift and lower the jack.

SUMMARY OF THE INVENTION

In addition to the control operation above referred to, further supplemental functions to be performed are desirable, partly to improve the comfort of operation and partly to reduce the danger of accidents due to operating errors.

An object of the present invention is to add further functions to the control system increasing the safety of operation and requiring little costs.

The present invention provides for a differentiating connected in series with a transducer for generating the position-responsive actual value, said differentiating network generating a signal proportional to the adjusting speed of the jack, and a summing network for generating a limiting signal from the speed-proportional signal and an adjustable maximum signal, which limiting signal is added to the signal of the jack controller controlling the lowering function of the jack.

The present invention provides for a substantial increase in safety of operation. Limiting the lowering speed helps to prevent a lowering of the mounted tool too fast which could be dangerous to the operating person or could result in damaging the mounted tool. Limiting the lowering speed is automatically activated in case it is required by the mode of operation and disabled in case it is not desired. According to a further feature of the invention an undesired adjustment of the mounted device is prevented when switches such as the switch selecting the mode of operation or a main switch are actuated. Still further, releasing the directional control valves for lifting and lowering the jack takes place in response to actuating an input element for setting the desired value of the position or force control.

IN THE DRAWINGS

The single FIGURE of the drawings is a block diagram of a control system according to the invention.

DETAILED DESCRIPTION

The electric output signal of a jack controller 10 is fed via a switch 11 or, respectively, 12 to a directional control valve 13 controlling the lifting motion and a directional control valve 14 controlling the lowering motion of a hydraulic jack 15. For example, feeding an electrical signal to the valve 13, the connection of a pressure source not shown to the hydraulic jack 15 is opened, thus lifting an agricultural device, in particular a plough, actuated by the jack. In controlling the valve 14, however, the operating cylinder of the jack 15 is connected to a reservoir for lowering the mounted device. Both valves 13 and 14 could be combined in a single directional control valve which is electrically controlled to initiate the lifting and lowering.

The position of the jack 15 in combination with the pulling resistance of the agricultural tool and the soil resistance results in a pulling force Z of the tractor 16 which must be generated by the engine 17 of the tractor. This results in an actual value of the speed n which is combined in a summing network 18 with a desired speed value of the setting element 19 corresponding to the position of the accelerator of the engine to produce a control signal which is fed to the controller 20 for delivering fuel to the engine 17. The actual power value proportional to the pulling force Z is fed via a transducer network 21 which is a proportional integrating circuit and a mode select switch 22 and further via a line 23 to a summing network 24.

The second input of the summing network 24 receives a desired value from the setting network 25 for the elevated position of the mounted device actuated by the jack. The mode select switch 22 may be operated from the neutral position shown in either the position for power-responsive control or, respectively, position-responsive control of the jack.

The control signal for the desired value of the penetration depth of the agricultural device is produced in the network 25 in accordance with a manipulator 26 setting a potentiometer, for example.

In selecting the position control by actuating the mode select switch 22, the elevated position of the jack 15 is converted in a transducer 27 to an electrical signal representative for the actual position which signal is fed via a proportional integrating differentiating circuit 28, the mode select switch 22 and the line 23 to the summing network 24. The control signal of the summing network 24 combining the actual value and the desired value of the potentiometer 26 is applied to the jack controller 10.

Furthermore, a fast response actuating means 30 is provided delivering a signal overriding the signal of the setting network 25 to allow a fast lift-off and rapid lowering of the mounted device as required for example in ploughing when the path of the tractor is reversed at the end of a furrow.

The signal produced in the transducer 27 in response to the position of the mounted device is fed to a differentiating network 31 in which a speed-proportional electrical signal is produced by a differentiating step. This signal is fed to a summing network 32 which second input is connected to a setting network 33 which may be adjusted to a predetermined lowering speed. The summing network 32 produces a lowering speed signal which does not exceed a maximum value to which the setting network 33 is adjusted. This limiting signal is fed via a switch 34 to a further summing network 35 which is provided in the line between the switch 12 and the control valve 14 for the lowering function. As long as the switch 34 is closed, the lowering speed of the mounted device is limited independent of the lowering signal delivered by the jack controller 10. This results in additional safety when the operator adjusts the manipulator 26 too fast in lowering the device. This prevents the mounted device from hard striking the ground.

The switch 34 is open when the mode select switch 21 is in the position for the operation "force control". Actuating the switch 34 in response to the mode select switch 22 is indicated by the dotted line 45. As it is familiar to the skilled person, in the power or force control the jack shall perform fast lifting and lowering motions to fully use the engine power of the tractor. The switch 34 is opened via the operative line 45 when in lowering the device the control signal fed to the jack controller 10 reaches the value set in the transducer 25, thus reaching the desired pulling force Z so that the force control may operate in an unrestrained manner.

Contrarily, when the mode select switch 22 is switched to "position control" the switch 34 is closed via the operative line 45 to activate the limiting signal to avoid lowering motions too fast during the operation.

Furthermore, the switch 34 is closed via an operative line 36 which is put in operation by the fast response actuating means 30. Accordingly, the lowering speed of the jack is determined independent of the power and in response to the setting network 33. This is advantageous in returning the plough to the furrow.

Furthermore, any actuation of the control valve 14 for lowering is locked in opening the switch 12. This opening takes place via the operative line 37 in response to any operation of the mode select switch 22. The switch 12 is closed only then when the manipulator 26 commands the network 25 to perform a lifting motion. The switch 12 may be closed via the operative line 37'. By this locking and releasing the switch 12 an undesired and uncontrolled lowering of the mounted device is prevented when the mode select switch 22 is operated.

A further feature of safety is accomplished by automatically operating the mode select switch 22 to the position of "position control" and locking any control of the valves 13 and 14 for lifting and lowering when the line voltage is applied to the control system, preferably when the ignition switch of the tractor is actuated. This prevents an accidental movement of the mounted tool when the manipulator 26 was actuated before the control system is put in operation or the engine is started.

Locking the valves 13 and 14 by opening the switches 11 and 12 takes place via the operative lines 39 and 39', wherein the signal which is produced by closing the ignition switch 38 is not restricted by the comparison network 41 which is provided in the signal line 39, 39'. Switching the mode select switch 22 to "position control" takes place via the signal line 40.

Subsequently, both control valves 13 and 14 must be released, thus the switches 11 and 12 must close. This is obtained by adjusting the manipulator 26 in a manner such that in the instantaneous position of the jack the set value is first exceeded towards "lowering" and immediately thereafter towards "lifting". This signal jump occurring at the output of the summing network 24 is fed via the line 42 to the comparison network 41 which delivers a signal through the signal line 39' to close the switches 11 and 12, provided the sequence of the signals "lowering/lifting" above referred to takes place within a predetermined value of time. Accordingly, the danger of any accident caused by uncontrolled motions of the mounted tool is greatly decreased when the system is put in operation, whereas the control is then subsequently activated by correspondingly actuating the manupulator.

I claim:

1. An electric circuit for controlling a tractor-pulled mounted device adjustable in height by a hydraulic jack, comprising a control for activating the lifting and lowering function of the jack, means for applying a differential signal to said control which differential signal is combined of a reference input defining a desired set value and either of a selected position-responsive actual value or a force-responsive actual value, an operator controlled mode select switch for selecting either position or force responsive control characterized in that a differentiating network for producing a signal proportional to the adjusting speed of the jack is connected in series to a transducer for producing the position-responsive actual signal, a summing network producing a limiting signal for the lowering speed in response to said speed-proportional signal and an adjustable maximum signal, said limiting signal being combined with the signal of the controller for controlling the lowering function of the jack, said limiting signal for the lowering speed being activated in response to operating said mode select switch to select the mode of operation either to position control or force control.

2. The circuitry of claim 1 wherein the limiting signal is interrupted in the force responsive control mode of operation.

3. The circuitry of claim 2, wherein the limiting signal is combined with the signal for controlling the lowering of the jack when the mode select switch is in the position of position responsive control and when the signal of a fast response actuating means overrides the desired signal.

4. The circuitry of claim 1, wherein a control signal is produced in actuating the mode select switch which control signal locks the actuation of a control valve for performing the lowering function of the jack and that the control valve for the lowering function is released when the set value is actuated to cause a lifting function of the jack.

5. The circuitry of claim 1 wherein the mode select switch is operated to switch to the position of position responsive control when the line voltage is switched on, the mode select switch producing a control signal which locks the actuation of a control valve for the lowering motion of the jack and a control valve for the lifting motion, and wherein the actuation of both control valves is released when the set value is actuated first towards performing a lowering action followed by an actuation performing a lifting operation.

6. The circuitry of claim 1 including an electrically controlled directional control valve for controlling the fluid conduits between a pressure source, the jack and reservoir, wherein respective switches are provided in the control lines for the lifting and lowering operation of the directional control valves and wherein a summing network for combining the limiting signal and the signal for the lowering operation is provided in the control line for the lowering operation.

* * * * *